United States Patent [19]

Lucchetti

[11] 4,050,498

[45] Sept. 27, 1977

[54] FRAME PARTICULARLY FOR STRETCHING A PIECE OF PAINTING CANVAS

[76] Inventor: Renato Lucchetti, Via M. Generoso, 46, Lomazzo (Como), Italy

[21] Appl. No.: 658,568

[22] Filed: Feb. 17, 1976

[30] Foreign Application Priority Data

Feb. 18, 1975   Italy .................................. 20361/75

[51] Int. Cl.² ............................ B44D 3/18; E04C 2/38
[52] U.S. Cl. ................................... 160/374.1; 52/657; 403/295; 403/402
[58] Field of Search ....................... 52/657; 160/374.1; 403/231, 52, 189, 190, 295, 402

[56] References Cited

U.S. PATENT DOCUMENTS

| | | | |
|---|---|---|---|
| 58,154 | 9/1866 | Todd | 160/374.1 |
| 172,511 | 1/1876 | Simpson | 160/374 |
| 1,128,362 | 2/1915 | Rawbon | 160/374.1 |
| 2,028,353 | 1/1936 | Roberts | 403/231 |
| 3,625,274 | 12/1971 | Johnson | 160/374.1 |

FOREIGN PATENT DOCUMENTS 59,314   4/1947   Netherlands .................... 403/231

*Primary Examiner*—Alfred C. Perham
*Attorney, Agent, or Firm*—Guido Modiano; Albert Josif

[57] ABSTRACT

A frame of rectangular shape particularly for stretching a piece of painting canvas, the frame comprising four strips connected between each other at the ends by means of joints of box-like configuration. The joints are made of sheet material and bent to define two converging channels in which the ends of corresponding strips are slidably inserted and retained. A V-shaped spring is inserted at the converging area of the channels and has two legs resiliently acting on the strip ends to cause stretching of the painting canvas held on the frame.

3 Claims, 4 Drawing Figures

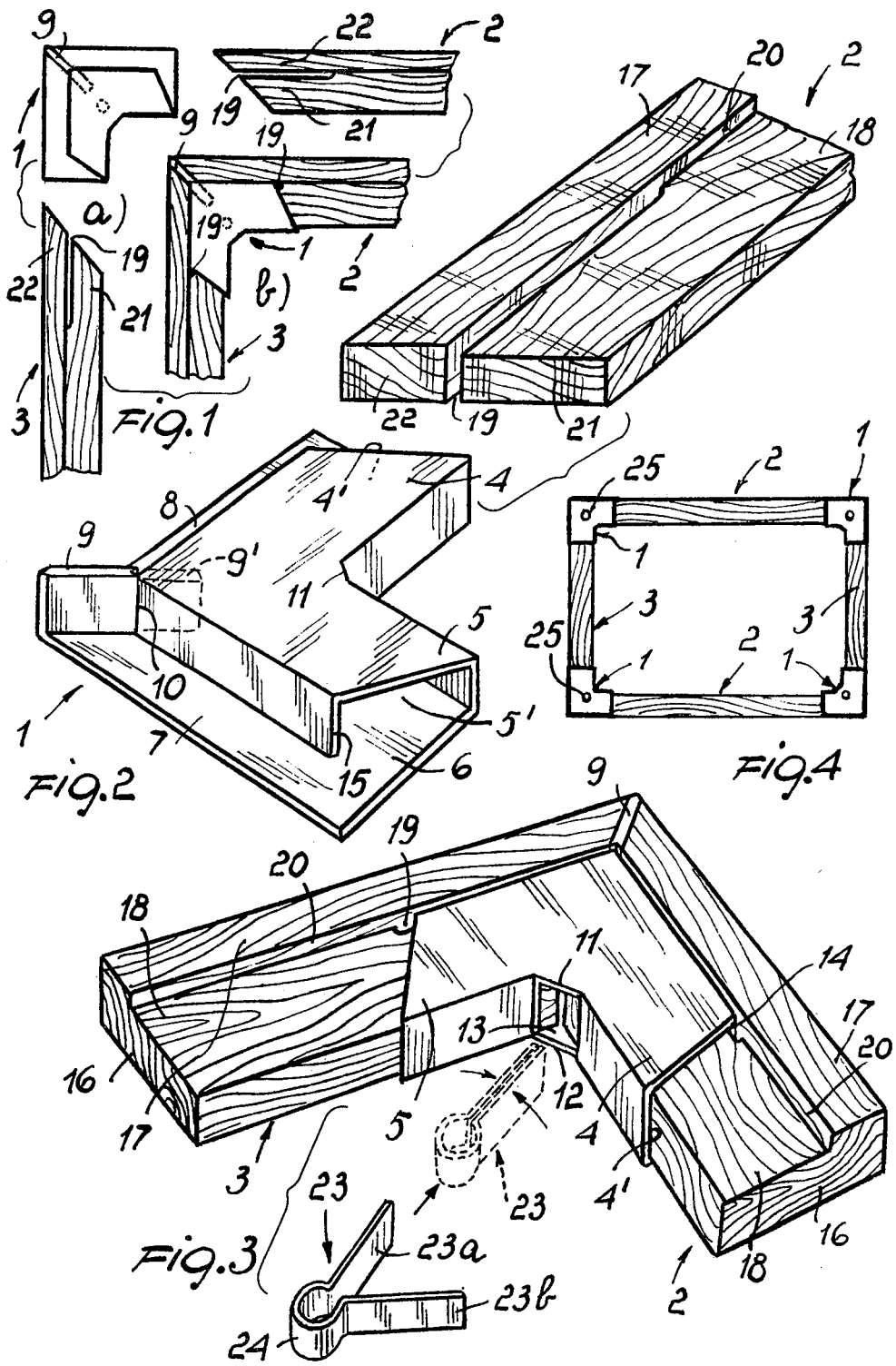

FRAME PARTICULARLY FOR STRETCHING A PIECE OF PAINTING CANVAS

BACKGROUND OF THE INVENTION

This invention relates to a painting frame provided with adjustable joints for the purpose of adjusting the tension on a piece of canvas attached thereto. More particularly, the invention concerns a corner joint which allows the depth of engagement of the frame side members within the joint to be varied. In a supporting frame whereto a canvas piece is affixed such that a painting or picture may be painted thereon, the problem arises of ensuring a uniform or even tension for the canvas, the latter being fastened to the frame by means of nails or tacks. The expert in the art, as well as the user of such articles, is well aware of the importance of the stretching operation in order to provide satisfactory results and a proper preservation of a painting. In order to facilitate such an operation, several forms of joint have been developed and applied in the past which, however, have in common the configuration of the frame side members or strips, having a 45° bevel at their ends, with one or more projecting lugs, and respectively one or more recesses, for joint engagement with the lugs of the contiguous side member or strip. The depth of insertion of each frame strip into a contiguous strip is made adjustable in a longitudinal direction by the interposition, within the recesses, of a wedge in each strip and at each end, there being provided eight adjusting wedges, i.e. two for each frame corner. In very large frames, further transverse or cross stretching strips may be inserted at intermediate positions between opposite sides. This known frame adjusting method, directed to evenly stretching the canvas, has some shortcomings. Both the lugs, or joint tongues, and their respective recesses or sockets have to be comparatively large and thin, while at the same time retaining their strength requirements. Their construction is thus a complex work, and requires several working steps. Furthermore, not all the kinds of wood lend themselves to such critical processing, and a selection of costly high quality woods becomes necessary. A further finishing step is then required for the strips in order to prevent the canvas from assuming antiaesthetic creased appearance due to its pressing against the strip inner corner edge; it is thus necessary to bevel inwardly the strip face whereon the canvas rests and to round off its inner corner edge. This operation also effects the cost of a frame of this type.

SUMMARY OF THE INVENTION

Thus, it is a general object of the present invention to obviate such shortcomings and drawbacks in the prior art painting frames.

It is a particular object of the invention to provide a corner joint for joining together contiguous side members of a frame as described above which eliminates the need for providing direct joints between such side members.

It is another particular object of the invention to provide a joint as above which facilitates the frame adjusting operation for stretching the canvas.

It is a further particular object of this invention to provide a joint as above which also permits the utilization of woods of inferior quality for the frame strip construction.

Yet another particular object of the invention is to provide a frame as described above, which is more economical to produce and has improved adjustment capabilities with respect to the prior frames.

These and other objects, such as will become apparent hereinafter from the ensuing description, are achieved, according to the invention, by a frame having adjustable joints between the side members for stretching a painting canvas, which comprises four strips of wood or other equivalent material, arranged to define a rectangular frame, and is characterized in that the converging strips at each corner are joined together by jointing in a right-angle corner coupling having a box-like structure provided with two converging channels or spaces, each receiving a strip longitudinally insertable thereinto with its end portion.

BRIEF DESCRIPTION OF THE DRAWINGS

The features and advantages of the inventive joint will be appreciated from the following detailed description of a preferred, though not exclusive nor restrictive, embodiment thereof, reference being made to the accompanying drawing, in which:

FIG. 1 is a plan top view of a joint according to the invention, with two strip ends pulled out, (a), and a joint with the strips inserted thereinto, (b);

FIG. 2 is a perspective view of a released joint, with one end of a pulled out strip facing the channel therefor;

FIG. 3 is a perspective view of a joint having the two strips inserted thereinto; and FIG. 4 is a schematic plan bottom view of a completely assembled frame according to the invention.

DESCRIPTION OF THE PREFERRED EMBODIMENTS

With reference to the drawings, and initially to FIG. 1, it can be seen how two strips converging to one and the same corner are shaped for insertion into a joint according to the invention, and are inserted thereinto for engagement therewith. The joint is identified generally with the reference numeral 1, while the numerals 2 and 3 identify, respectively, two strips associated to the joint, the ends whereof may be seen in a first position (a), facing the joint in alignment therewith but withdrawn therefrom, and in a position (b), inserted thereinto. The details of the joint and strips are best shown in FIG. 2. The joint 1 is a box-like structure constructed on a thin or laminar material, e.g. of an injection molded or cast plastic material; it may be made, actually, of any suitable material, including bent and welded metal sheet, or in any other manner, plastic being preferred on account of its low cost. The two essential parts of the joint are two prismatic portions, 4 and 5, at a right angle to each other and defining two channel-like spaces 4' (see FIG. 2) and 5', respectively, which are contiguous and communicating with each other. The bottom wall 6 of the joint and channels projects therefrom outwardly to form two broad flat edges, 7 and 8. On the junction line of the two edges, a rib 9 extends which joins the corner 10 to form the outer apex of the two prismatic portions, 4 and 5. The rib 9 extends, for a given length, inside the channels 4 and 5, with an extension or appendix 9' having a thickness dimension greater than the rib 9. The appendix 9' is effective to cause any contact with the strips to occur at those areas of the strip which are internal to the prismatic portions 4 and 5, while avoiding any forcing which, if made to act on the outer edges of the strips, would be likely to cause the strips to crack or break.

The two prismatic portions are interconnected internally by oblique or slanting sides 11 and 12, which define a window 13. The outer walls 14 and 15 of the channels 4' and 5', respectively, are suitably singled out and identified in the drawing, since these have also a specific role to play. The strips adapted for the inventive joint have a much simplified structure, and present a stepped cross-section 16 (FIG. 3), whereby the upper face, i.e. the face whereon the canvas rests, has a raised face 17 and a recessed face 18. At the end of each strip 2 and 3, facing the joint, a longitudinal notch or slot 19 is cut in the strip along the minor side and at the step 20. This notch 19 divides the strip into a tongue or insert 21 and a ridge 22. The insertion of each strip into the corner joint is greatly simplified and facilitated: the nothc 19 slides over the wall 14 or 15, the tongue 21 slides into the channel 4' or 5', acting as a sleeve therefor. Two fully inserted strips into the common joint abut with their respective ridges on the rib 9. In order to adjust the depth of insertion or engagement of each strip into the joint 1, an adjusting element is provided which comprises a V-shaped spring 23, the two legs whereof, respectively 23a and 23b, are resiliently connected together by an arcuate portion 24.

The insertion of the spring 23 is effected through the window 13 into the thin interspace created by the presence of the appendix 9' between the two confronting strips. To this aim, all that is required is that the legs 23a and 23b be united together and inserted into said interspace, the arcuate portion 24 acting as a pin member. The legs 23a and 23b, by acting resiliently on the strip ends, cause automatically to displace that strip which is less stretched by the canvas, whereby an equilibrium between movement and tension is achieved naturally which ensures an even stretching of the canvas.

This is made possible by the fact that the two converging strips are individually guided by their respective channels, thus eliminating the need for a wedge for each strip in order to define their precise location.

Therefore, a superior degree of accuracy in defining the independent positions of each strip has been achieved, thanks to the geometric guides, and the operation has been made much quicker, being no longer dependent on a series of mutually influencing attempts, but rendered adjustable in a continuous andd automatic manner, the movement of shifting of one strip being independent of the other strip shifting, since the guides are made independent of each other. Moreover, in the bottom wall 6, at the covergency area of the channels 4 and 5, a through hole 25 is provided which permits a screwdriver or the like to be inserted in order to act with greater force, if required, on the strip ends.

Another advantage of the embodiment is represented by the rib 9, which is effective to restrict the final spacing of the two edges of the separated strips, thus preventing the risk of the canvas getting into the interspace and distoring.

To this aim, the rib 9 is advantageously made higher than the corner edge 10 and flush with the strip faces 17.

FIG. 4 shows an assembled frame, as seen from the side opposite to the canvas and intended for hanging against a wall. Obviously, a frame assembled according to the instant invention teachings, also allows, when the size requires it, the addition of stiffening strips or cross-members at an intermediate location between the sides.

The extremely simple and rough shaping of the strip members, to be carried out in one pass, includes the forming of a recessed area, identified with the surface 18, in order to allow for the insertion of the strip member into the joint, the latter having been kept low such as not to interfere with the resting surface of the canvas on the frame. With this resulting form, the canvas rests on the face 17 of the flat strip, which projects upwards. The canvas is thus subjected to being marked by the sharp edge formed with the face 17 of the step 20. However, this crease, which would have a merely aesthetic value, remains concealed under the final framing of the finished painting, it being restricted to a fairly small margin area of the canvas stretching frame. Atternatively, according to a modification of the invention, instead of a V-shaped spring for adjusting the positions of the inserted strips in their respective channels, a wedge element could be interposed with its apex portion penetrating between the confronting faces of the strips.

The invention just described may be practiced in a number of equivalent forms, which may include markedly different aspects. For instance, the joint may be reduced to a simple elbow member composed of the two channels without the edges 7 and 8, and without the rib 9, the channels 4' and 5' being designed for receiving the full cross-section of a strip. With respect to such a simplification, the described structure represents an improvement. It should be obvious that simplifications, such as the one just described, variations and further developments based upon the inventive concept hereinabove described and detailed, should fall within the scope of the present invention.

I claim:

1. A frame particularly for stretching a piece of painting canvas laid thereon, which comprises four wooden strips or strips of an equivalent material arranged to form a quadrangle, the converging strips at each corner being jointed together by jointing in a right angle type of joint, said joint having a box-like structure provided with two converging channels or spaces, each receiving a strip longitudinally insertable thereinto with its end portion, wherein each strip has a prismatic configuration of generally rectangular cross-section, a step formed along the major surface thereof, thus defining a peripheral face which projects further out and whereon the piece of canvas can rest, and an underlying recessed face, underneath the canvas piece, and out of contact therewith when the canvas piece is stretched, each strip having at its end portions a 45° beveled end provided with a through slot extending longitudinally and parallel to the cross-section minor side of the strip and separating, at said step, the end of the strip into a rib portion and a tongue portion, each having a rectangular cross-section, and wherein, according to the improvement the joint is composed of a laminar or sheet material and comprises a flat base defining two converging and communicating channels at a right angle to each other, into which channels there are insertable and guidable, respectively, the tongue portions of the strips with the outer side wall of each channel inserted within said slot, said rib portion resting on and being guided by a portion of the base plane of the joint projecting beyond the channels, at the outer apex formed by the two channels a ridge perpendicular to the base plane in a diagonal direction externally to the box structure formed by the two channels, at the inner apex of the two channels convergency portion a window and an adjusting element insertable through said window.

2. A frame according to claim 1, further comprising on the extension of said ridge, for a length inside the convergency area of said two channels, an appendix which is thicker than said ridge.

3. A frame according to claim 1, characterized in that said flat base has at the convergency area of said two channels a through hole.

* * * * *